May 1, 1928.
C. H. COWAN, JR
SWIFT
Filed June 6, 1925 — 2 Sheets-Sheet 1
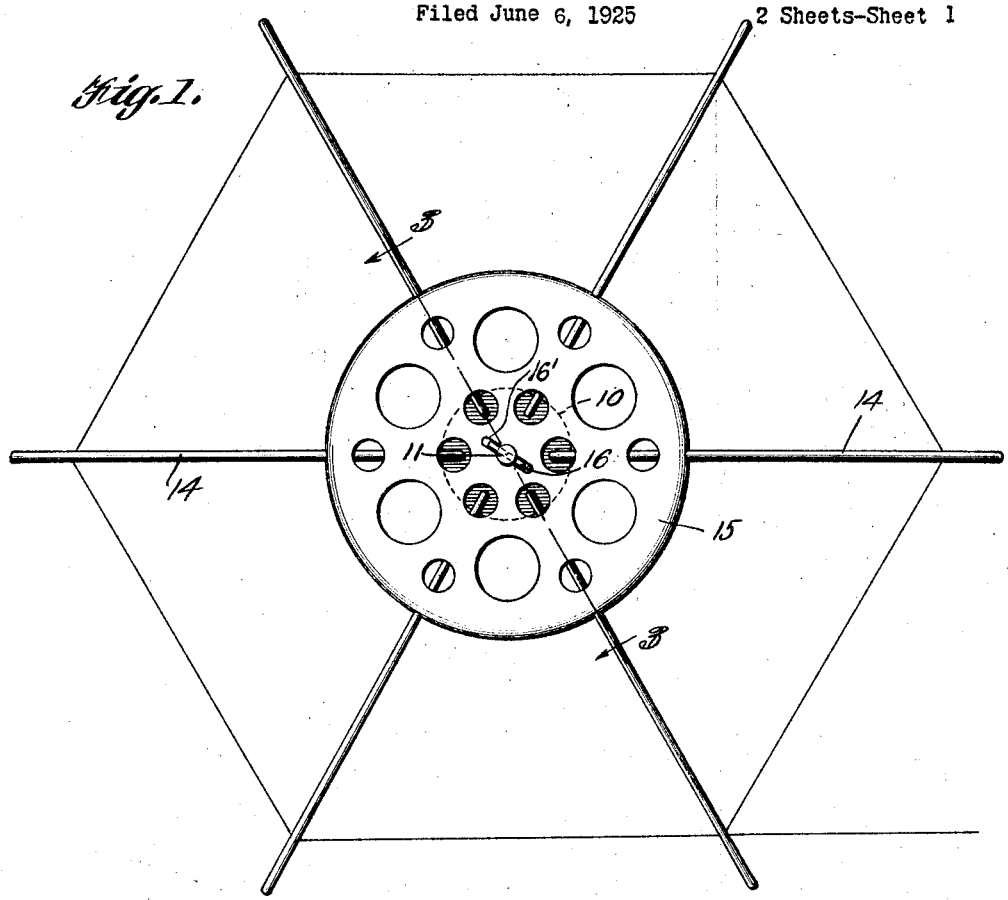
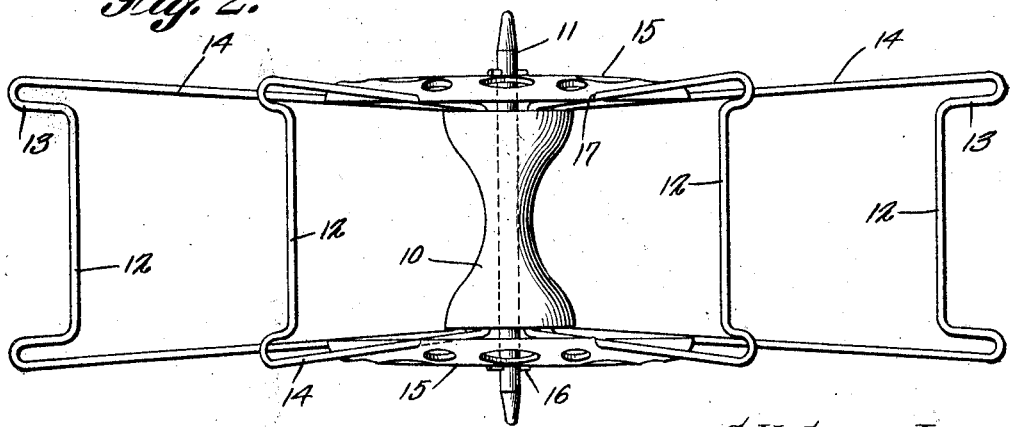

May 1, 1928. 1,668,492
C. H. COWAN, JR
SWIFT
Filed June 6, 1925 2 Sheets-Sheet 2
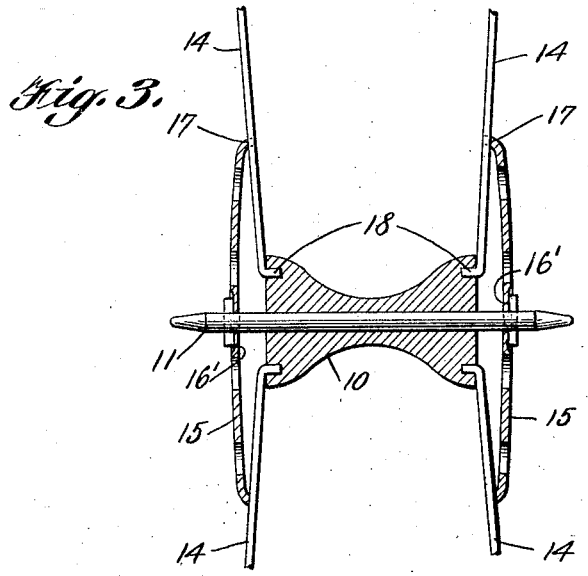
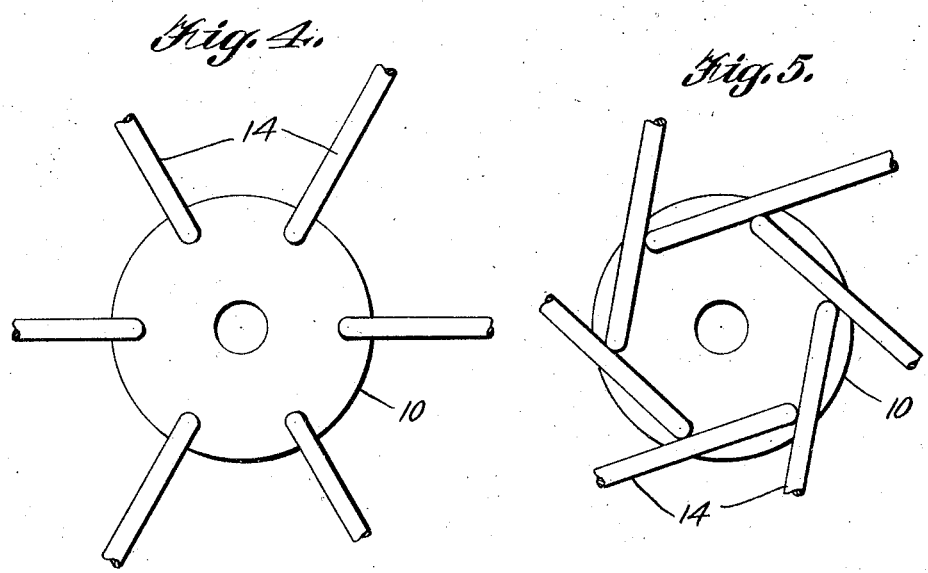
C. H. Cowan, Jr., INVENTOR
BY Victor J. Evans
ATTORNEY
WITNESS:

Patented May 1, 1928.

1,668,492

UNITED STATES PATENT OFFICE.

CHARLES H. COWAN, JR., OF STONINGTON, CONNECTICUT.

SWIFT.

Application filed June 6, 1925. Serial No. 35,430.

This invention relates to improvements in what is known throughout the textile industry as swifts and which contemplates the provision of a hub having the opposite ends of a gudgeon extending outwardly an appreciable distance upon the opposite ends of the hub and which hub further includes upon the outer side faces thereof and adapted to receive within openings provided therein, the inner offset ends of supporting arms whose length therefrom may be materially lengthened and shortened by the successive revolutions of the hub independent of the arms or spokes.

A further object of my invention is the provision of a pair of disks received on the outer ends of the gudgeon and which includes a plurality of spaced notched portions provided upon its inner edges and adapted to receive the corresponding sides of the spokes or arms therein whereby the said spokes or arms may be held rigidly in locked position when so desired.

With the above and other objects in view, the invention further includes the following novel features and details of construction, to be hereinafter more fully described, illustrated in the accompanying drawings and pointed out in the appended claim.

In the drawings:—

Figure 1 is a side elevation of my invention.

Figure 2 is a top plan view thereof.

Figure 3 is a sectional view taken on line 3—3 of Figure 1.

Figure 4 is an end elevation of the hub with the spokes in section and showing the said spokes arranged in extended positions.

Figure 5 is a similar view of the hub and spokes with the hub partially rotated and the spokes or arms shortened.

Referring to the drawings in detail, wherein like characters of reference denote corresponding parts, the reference character 10 indicates a hub which may be of the common or any preferred type and which has extending centrally and longitudinally therethrough a gudgeon 11 which in turn has its opposite ends extending outwardly an appreciable distance from the outer ends of the hub 10. The spokes or arms, as mentioned in the foregoing, are formed of singular lengths of wire and the like and which extend in pairs in radially disposed relations upon the opposite sides or ends of the hub 10 and which are further bent intermediately upon themselves to provide transversely disposed cross heads 12 including side walls 13 which in turn extend upwardly and downwardly with the spokes per se as indicated at 14. A pair of centrally apertured dish shaped disks are received upon the outer ends of the gudgeon 11 and held against displacement thereon through the instrumentality of cross pins 16, being partially received within grooves 16', within the outer sides of the disks 15 in order that the pins will be held against displacement within the outer ends of the gudgeon 11; while the inner edges of the disks 15 further include a plurality of notched or cutout portions 17 arranged at spaced intervals upon the peripheries thereon, and the purpose of such disks 15 will be hereinafter more fully apparent.

The spokes 14 further include inwardly extending offset portions 18 upon their inner free ends and which are received within sockets provided in the outer ends of the hub 10 while portions of the outer sides of the spokes 14 are received within the grooves or cutout portions 17 provided in the inner edges of the disks 15.

In the mode of operation of the present invention it is clearly noted that owing to the especial form of sockets associating the inwardly offset ends 18 of the spokes 14 within the sockets or openings provided in the outer ends of the hub 10 and adapted to have their outer sides received within the sockets or cutout portions 17 provided in the edges of the disks 15 that the length of the spokes 14 may be lengthened and shortened by rotating the hub independently of the disks and in so doing will lengthen and shorten the spokes in the manner as clearly illustrated in Figures 4 and 5 respectively. In so doing it will be noted that after a skein of silk, yarn or the like has been placed upon the cross heads 12 and against the side walls 13 provided therefor, that by rotating the hub 10 independently of the disks 15, the spokes 14 will be materially lengthened and the skein of silk will be held firmly in order that the skein may be readily and easily wound from swift to spool, bobbin, or similar device.

The invention is susceptible of various changes in its form, proportions and minor details of construction, and the right is herein reserved to make such changes as properly fall within the scope of the appended claim.

Having described my invention what is claimed is:

A swift comprising a hub provided with a gudgeon extended centrally of the longitudinal axis thereof, spokes formed from singular lengths of wire bent intermediately upon themselves to provide cross heads, the side walls of the spokes are inwardly bent and terminate to provide offset extremities received within the ends of the hub, dish-shaped disk members carried upon the ends of the gudgeon are provided with notches in the peripheries thereof to partially receive and inwardly tension the side walls of the spokes, said disks have grooved portions adjacent the association of the gudgeon therewith, and cross pins carried by the gudgeons positioned within the grooves and retained by the tension of the side walls of the spokes.

In testimony whereof I affix my signature.

CHARLES H. COWAN, Jr.